United States Patent [19]

Tanaka

[11] Patent Number: 4,982,390
[45] Date of Patent: Jan. 1, 1991

[54] REAL TIME SIGNAL RECORDING APPARATUS FOR EFFECTING VARIABLE SIGNAL TRANSFER RATE

[75] Inventor: Yoichiro Tanaka, Kawasaki, Japan

[73] Assignee: Kabushiki Kaisha Toshiba, Kawasaki, Japan

[21] Appl. No.: 259,527

[22] Filed: Oct. 18, 1988

[30] Foreign Application Priority Data

Dec. 15, 1987 [JP] Japan ............................ 63-317036
Mar. 31, 1988 [JP] Japan ............................ 63-76558

[51] Int. Cl.$^5$ .............................................. G11B 20/00
[52] U.S. Cl. .................................. 369/30; 369/60; 360/7
[58] Field of Search ............... 360/5, 7, 8; 369/30, 369/53, 60; 358/335, 906, 909

[56] References Cited

U.S. PATENT DOCUMENTS 4,408,309 10/1983 Kiesling et al. .................... 360/7 X
4,531,161 7/1985 Murakoshi .......................... 358/906 X
4,633,331 12/1986 McGrady et al. ..................... 360/7

FOREIGN PATENT DOCUMENTS 52-141215 11/1977 Japan .
54-26163 9/1979 Japan .
6242326 9/1987 Japan .

Primary Examiner—Robert L. Richardson
Attorney, Agent, or Firm—Oblon, Spivak, McClelland, Maier & Neustadt

[57] ABSTRACT

A signal recording apparatus includes a temporary memory for writing an input signal at a predetermined signal-transfer rate and reading it out in the same sequence as input, and a main recorder for recording the signal read out from the temporary memory. The reading signal-transfer rate of the temporary memory is variable. The apparatus further includes a controller which, upon receiving a data-save instruction, sets the reading signal transfer rate of the temporary memory faster than its writing signal transer rate and transfers the signal from this memory to the main recorder.

5 Claims, 5 Drawing Sheets

FIG. 5

| TIME | INPUT DATA | FIFO ADDRESS | | | | | | | | OUTPUT DATA |
|---|---|---|---|---|---|---|---|---|---|---|
| | | A1 | A2 | A3 | ... | AN-3 | AN-2 | AN-1 | AN | |
| t0 | Dn+2, Dn+1, Dn | Dn-1 | Dn-2 | Dn-3 | ...... | D3 | D2 | D1 | D0 | → D0 |
| t1 | Dn+3, Dn+2, Dn+1 | Dn | Dn-1 | Dn-2 | ...... | D4 | D3 | D2 | D1 | → D1, D0 |
| t2 | Dn+4, Dn+3, Dn+2 | Dn+1 | Dn | Dn-1 | ...... | D5 | D4 | D3 | D2 | → D2, D1, D0 |
| t3 | Dn+5, Dn+4, Dn+3 | Dn+2 | Dn+1 | Dn | ...... | D6 | D5 | D4 | D3 | |
| ... | | | | | | | | | | |
| tk-1 | | | | | | | | | | |
| tk | | | | | | | | | | |
| tk+2 | | | | | | | | | | |

REAL TIME SIGNAL RECORDING APPARATUS FOR EFFECTING VARIABLE SIGNAL TRANSFER RATE

BACKGROUND OF THE INVENTION

1. Field of the Invention

The present invention relates to an apparatus for recording a biological signal, an earthquake wave, a video signals, a voice signal and other types of signal, and, in particular, to a signal recording apparatus which, when instructed to start a signal recording, is capable of recording the necessary signal.

2. Description of the Related Art

A recording apparatus which uses magnetic tapes or recording disk media, such as magnetic disks and optical disks, serves as an external storage device for use in a data processing device or as a medium for recording, in real time, signals transmitted in one direction or unexpectedly-generated signals.

In general, it is not easy to select only a desired, arbitrary signal from those signals input in real time, and record it in real time. If, as with a telecast or radio broadcast, the telecast time is known in advance, the signal can be recorded at the telecast time; however, for recording a desired signal whose generation is not known in advance, it is not possible to pick up and record only that signal. With regard to a telecast program, for example, it is easy to record the entire program, but it is difficult to select only a specific scene or music from the program and record it from the beginning. Neither is it possible to completely record those signals such as earthquake wave or unusual cardio-wave signals whose generation is unpredictable or unexpected.

In order to record such an unexpectedly-generated signal, one can simply temporarily record all the signals input in real time and select only the desired portion later. However, such editing requires a vast amount of memory capacity for temporary storage, as well as a significant amount of effort. With an endless tape used for temporary storage, a relatively small amount of memory capacity is needed, but the signal-storable range is limited to the time in which the endless tape circulates. It is therefore not possible to record the entire signal generated over the period before and after the desired signal time.

A so-called past-data for use in a telephone, which records a conversation made by the operator a certain period of time prior to the present time, is also known. A conventional past-data recorder repeatedly updates the data recording in such a way that the most recent signal for a given time always remains in the IC memory and the replacement of the most recent signal stored as new data is stopped by data-save instruction to preserve and reproduce the content of the IC memory. This makes it impossible to record a signal coming after the reception of the data-save instruction in the same memory, and necessitates the use of another memory for recording the signal. Therefore, continuous signals are separately recorded in plural memories, so that in practice, specific editing is necessary to collect and store these signals in one memory. In order to record a sequence of signals in the same memory in real time, first the content of a first memory for recording of past data should be read out in response to a data-save instruction and should then be transferred to a second memory so that the first memory is again ready for recording. As a result, there would be an inability to record during the time required to transfer the content of the first memory to the second memory. According to the prior art, therefore, it is not possible to selectively record in real time only the desired one of a number of signals input in real time on a single recording medium, and a period exists during which recording cannot be executed.

SUMMARY OF THE INVENTION

Accordingly, it is an object of this invention to provide a signal recording apparatus which records in real time only the desired one of a number of signals input in real time on a single recording medium thus overcoming the drawback of the prior art, i.e., a non-recording period.

To achieve this object, there is provided a signal recording apparatus which includes:

temporary storage means with a variable read signal-transfer rate, in which an input signal is written at a predetermined signal-transfer rate and from which the input signal is read out in the same sequence as input;

main recording means for recording a signal read out from the temporary storage means; and control means capable of setting upon reception of a data-save instruction that outputs a start-writing signal to the main recording means, a speed for reading out the signal from the temporary storage means faster than a signal-transfer rate for writing a signal into the temporary storage means, and transferring the read signal to the main recording means.

With the above structure, the signal recording apparatus embodying this invention can permit a parallel operation of signal writing in and signal reading from a temporary memory, and can read out a signal from the temporary memory at a signal-transfer rate faster than the writing signal-transfer rate and transfer the read signal to a main recorder upon receiving the data-save instruction. Therefore, it is possible to record in the main recorder the necessary signal input prior to the reception of the data-save instruction. Since the temporary memory continues its writing operation while its content is being transferred at a high signal-transfer rate to the main recorder, the necessary signal input during this signal transfer can be recorded without a blank space in the main recorder.

Further, since only the necessary signal is recorded in the main recorder in the order it has been input, it is possible to eliminate troublesome editing after recording as well as to reduce the required capacity of the recording medium in the main recorder. Furthermore, the recording of a sequence of signals on the same recording medium facilitates management of recording media.

According to this invention, if a disk memory having a far greater memory capacity than a semiconductor memory is used for the temporary memory, it is possible to record data input earlier over a significantly long period of time. In this case, if the write and read heads are designed to perform an endless write/read operation while reciprocating in the radial direction on a recording disk, data blank periods rarely occur in the temporary memory.

If all the signals stored in the temporary memory are read out and it is a newly written signal that is to be read out, the input signal to the temporary memory can be transferred directly to the main recorder, thus ensuring the recording of a signal continuously input for a longer period of time than is defined by the capacity of the temporary memory in the main recorder without any blank periods or non-recording periods.

BRIEF DESCRIPTION OF THE DRAWINGS

FIG. 5 is a diagram illustrating the storage status of data in the FIFO memory 21 shown in FIG. 4 and variations over time in data storage status in accordance with an input/output operation;

DETAILED DESCRIPTION OF THE PREFERRED EMBODIMENTS

An embodiment of this invention will be described below with reference to the accompanying drawings.

Figure 1:
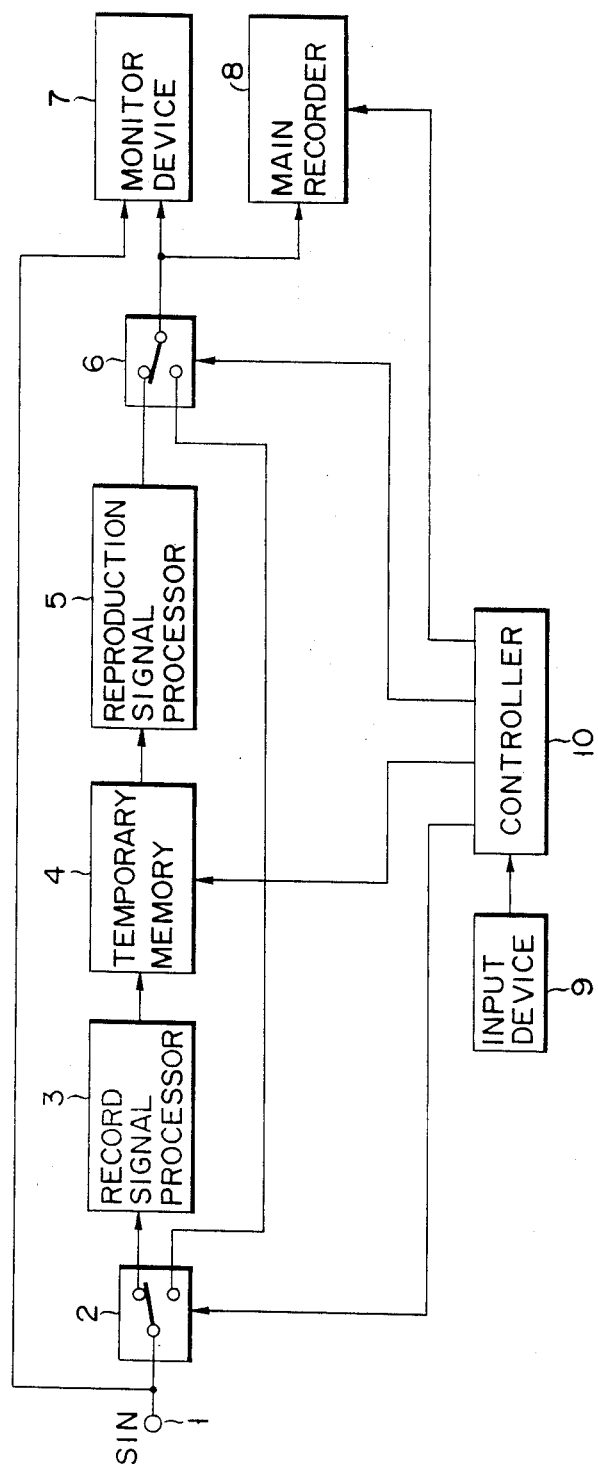
FIG. 1 is a block diagram illustrating the arrangement of a signal recording apparatus according to one embodiment of this invention.

In FIG. 1, a signal input terminal 1 is supplied with an input signal Sin, such as a video or voice signal. This input signal Sin is supplied to a record signal processor 3 through an input switching circuit 2 which is controlled by a controller 10. After the signal Sin is subjected by processor 3 to a process such as a modulation in a system suitable for the storage status in a temporary memory 4, it is written in temporary memory 4 under the control of controller 10.

The signal stored in temporary memory 4 is read out under the control of controller 10, is subjected to a demodulation process by a reproduction signal processor 5, and is then supplied to a monitor device 7 and a main recorder 8 through an output switching circuit 6 that is controlled by controller 10. Monitor device 7 uses either a video monitor or a voice monitor in accordance with the input signal Sin. This monitor device 7 is also supplied with the input signal Sin. Main recorder 8 preferably uses a disk memory, tape memory or semiconductor memory having a larger capacity than temporary memory 4. Controller 10, which is constituted by a general-purpose microcomputer and may be contained in one chip, is coupled with a keyboard or other input device 9 by means of which a user enters various instructions for data saving.

Temporary memory 4 can write an input signal at a constant signal-transfer rate and read it out in the same sequence as input and the reading signal-transfer rate is variable. A disk memory as shown in FIG. 2 may be used as memory 4.

Figure 2:
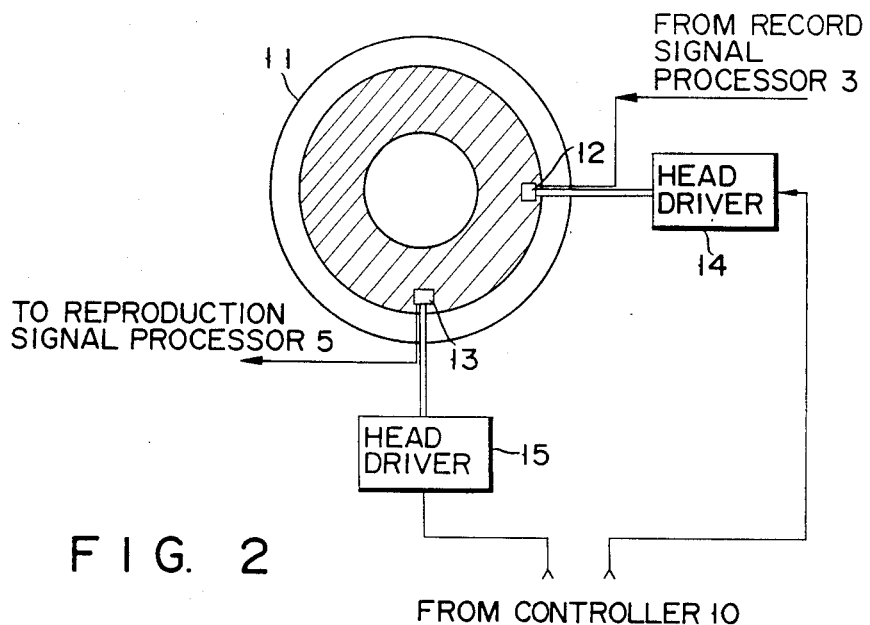
FIG. 2 is a diagram illustrating a practical arrangement of a temporary memory as shown in FIG. 1.

In FIG. 2, a recording disk 11 is a magnetic or optical disk which is accessed for write (recording) and read (reproducing) operations by means of a write head 12 and a read head 13. Heads 12 and 13 may be of a magnetic type or an optical type, depending on the type of the recording disk 11, and are driven by head drivers 14 and 15 to reciprocally move over the disk 11 in the radial direction for executing write and read operations.

Figure 3:
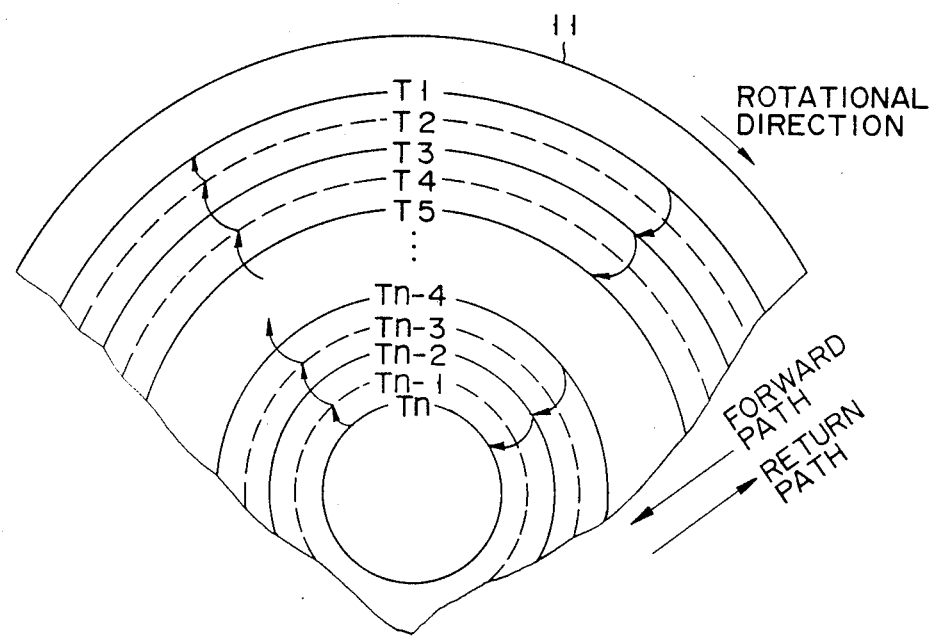
FIG. 3 is a diagram for explaining the track pattern on a recording medium shown in FIG. 2 and the moving patterns of write and read heads also shown in FIG. 2.

The plural concentric loci (tracks) formed on recording disk 11 by write head 12 include two types of tracks which are respectively and alternately formed by the inward and outward movements of write head 12 as shown in FIG. 3. More specifically, in the forward path of write head 12 moving from the outer periphery toward the center of recording disk 11, head 12 forms tracks T1, T3, T5, ..., Tn−4, Tn−2, and Tn, and after reaching the track Tn, head 12 moves in the opposite direction. In the return path of write head 12 moving from the inner part to the outer periphery of recording medium 11, head 12 forms tracks Tn−1, Tn−3, Tn−5, ..., T6, T4, T2, and T1. When write head reaches track T1 in its return path, it reverses its moving direction again and forms tracks T1, T3, T5, ..., Tn−4, Tn−2 and Tn. In this manner, write head 12 repeatedly reciprocates on recording disk 11 to execute a so-called endless writing operation. The one cycle of this endless writing operation is the time required for write head 12 to reciprocate once on recording disk 11 in the radial direction and is expressed as $n \times Tw$ where n is the number of tracks and Tw is the moving time pitch of write head 12 (time required for head 12 to move from the beginning of one track to the beginning of another).

Read head 13 executes the reading operation while forming tracks in the same manner as write head 12. In the normal mode (the record ready mode of main recorder 8), read head 13 is located at the position preceding that of write head 12 in the rotational direction of recording disk 11. In other words, read head 13 is located upstream of the same track on which write head 12 is located, or on a track preceding the track on which head 12 is located. That is, read head 13 is located at a preceding position to the part of disk 11 which is to be written over by write head 12 and is reading the oldest signal written on disk 11 or a signal approximate to the oldest signal. The moving time pitch for read head 13, Tr, can be arbitrarily set in the range $Tr \leq Tw$; $Tr = Tw$ in the record ready mode of main recorder 8 and $Tr < Tw$ in the recording mode.

Head drivers 14 and 15 are controlled by controller 10 to move write head 12 and read head 13 in the above-mentioned manner.

A description will now be given of the operation of the signal recording apparatus of this embodiment. In the record ready mode, input switching circuit 2 (FIG. 1) is switched to the mode for supplying the input signal Sin to record signal processor 3, and write and read heads 12 and 13 perform the endless write and read operations, as described above. At this time, the moving time pitches of write and read heads 12 and 13 are equal to each other ($Tw = Tr$), and the input signal Sin is displayed as a video image or generated as a voice signal by monitor device 7.

Since no data can be recorded during the time in which write head 12 moves from one track on recording disk 11 to another in this mode, it is desirable that the input signal Sin should be compressed along its time axis in advance or by record signal processor 3 so that a record signal is supplied to write head 12 only during the recordable time in which head 12 is on a track. A process for expanding the compressed signal along the time axis may be executed in reproduction signal processor 5.

The user monitors the input signal Sin by means of monitor device 7, and sends an access command to controller 10 through input device 9 when confirming the part of signal Sin he wants to save. Upon receiving the access command, controller 10 switches output switching circuit 6 to the mode for selecting an output signal Sout of reproduction signal processor 5 and instructs monitor device 7 to display the signal Sout. After confirming the signal on the display, the user instructs read head 13 to move to the beginning of the region where the desired signal is stored and then enters a data-save instruction through input device 9.

Upon receiving the data-save instruction from input device 9, controller 10 sends a fast-forward command to head driver 15 for read head 13 to set the moving time pitch of head 13 smaller than that of write head 12 (Tr<Tw) and simultaneously sets main recorder 8 in the recording mode. In this case, since read head 13 moves faster on recording disk 11 than write head 12, and the time axis of the signal read out does not change, the signal can be read out faster than it has been written. Thus the read signal is subjected to demodulation and expansion along the time axis in reproduction signal processor 5 and is then transferred through output switching circuit 6 to main recorder 8.

At this time, the time interval of the signal to be transferred to main recorder 8 becomes shorter in accordance with the moving speed of read head 13. Therefore, when a sync signal synchronized with this moving speed is supplied to main recorder 8 from controller 10 for signal reproduction from recorder 8, the same signal as the input signal Sin can be generated. As the signal to be read out by read head 13 is what has been recorded prior to the point of time where the data-save instruction has been given to controller 10 from input device 9, main recorder 8 will record the input signal Sin from the beginning of the desired part thereof.

If the time during which the signal to be recorded on main recorder 8 is input is greater than the endless recording cycle on recording disk 11, when read head 13 reaches the position of write head 12, i.e., when the signal to be read out by read head 13 becomes the signal to be newly written by write head 12, controller 10 switches input switching circuit 2 to the mode for supplying the input signal Sin to output switching circuit 6 and switches the circuit 6 to the mode for selecting the output signal of the circuit 2. As a result, the input signal Sin is sent to main recorder 8. And, when a record stop instruction is supplied to controller 10 through input device 9 upon completion the input operation of the desired signal, the recording operation of main recorder 8 is stopped and input switching circuit 2 is switched to the mode for supplying the input signal Sin to record signal processor 3 and, simultaneously, the moving speed of read head 13 becomes equal to that of write head 12, thus returning to the initial ready mode.

As described above, the signal recording apparatus according to this embodiment can record the desired part of an input signal Sin by means of main recorder 8, as well as continuously record a signal which is longer than the time defined by the endless recording cycle on recording disk 11, without any blanks.

With the use of the present apparatus, therefore, in recording a telecast or radio broadcasting program, even when a data-save instruction is entered after a desired scene or music has started, such a scene or music can be recorded from the beginning, as long as the instruction is given within the endless cycle on recording disk 11. In this case, only the desired signal is recorded in main recorder 8 and, what is more, all the desired signal to be finally recorded is recorded on a single recording medium, thus eliminating the need for troublesome editing and facilitating the management of recording media.

Further, according to the above embodiment, write head 12 and read head 13 are designed to execute the writing and reading operations while reciprocating on recording disk 11 in the radial direction. This eliminates the extra time needed for each head to return to, for example, the outermost track of recording disk 11 after reaching the innermost track from the outer periphery, which would be necessary in a conventional case where the heads perform the endless recording and reproducing operations while moving in one direction (e.g., from the outermost track toward the innermost one) and therefore almost completely eliminates a non-recording period. Of course, when the returning time of the write head is sufficiently short, so that the blank recording period can be dealt with by the aforementioned signal compression along the time axis, the moving direction of write head 12 and read head 13 for write and read operation may be set in only one direction.

Figure 4:
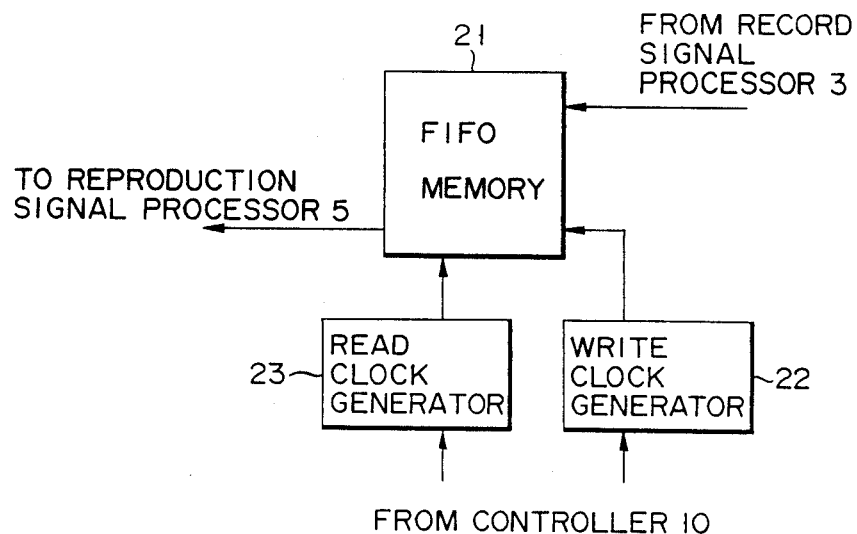
FIG. 4 is a diagram illustrating the arrangement of a modification of the temporary memory shown in FIG. 1.

FIG. 4 illustrates an another example of temporary memory 4 in this invention, which uses an FIFO (First In First Out) memory 21 (semiconductor memory) in place of the recording disk 11 as shown in FIG. 2. It is known that an FIFO memory has a built-in address generator and sequentially stores an input signal and reads out its content in the same sequence as the input sequence in response to an external clock signal. FIFO memory 21 is supplied with write and read clocks respectively from a write clock generator 22 and read clock generator 23.

FIFO memory 21 has a memory capacity of N bits and has N memory addresses A1, A2, . . . , AN-1 and AN, as shown in FIG. 5. Here, a write address is always A1, and the input signal Sin is subjected to, for example, A/D conversion in record signal processor 3 shown in FIG. 1 and is then written at address Al first. Given that Vi (bps) is the transfer rate of digitized input data, the writing speed of memory 21, i.e. the frequency of the write clock generated from write clock generator 22, is set to be the transfer rate. Therefore, data Dn-1 stored at address A1 at time t0 is moved to address A2 at the next time $t1 = t0 + 1/Vi$. Similarly, at $t2 = t0 + 2/Vi$, data Dn+1 is written at address A1 and, at the same time, data moves within memory 21 in such a way that Dn moves to address A2, Dn-1 to address A3 and so forth.

In the normal write/read operation mode of memory 21, its output address is always An. As memory 21 has a capacity of N bits, the input signal data is read out with a delay of N/Vi in the normal write/read mode. That is, in this mode, the oldest data in memory 21 is stored at address An. FIG. 5 illustrates the movement of data at the individual addresses A1-AN in memory 21 and a variation in input/output data with time in the normal write/read mode.

The reading data-transfer rate Vo of memory 21, i.e., the frequency of the read clock generated from read clock generator 23 can arbitrarily be changed within the range of $Vo \geq Vi$ under the control of controller 10; $Vo = Vi$ in the record ready mode of main recorder 8 and $Vo > Vi$ in the recording mode. This feature permits temporary memory 4 to perform the same operation as in the case where a disk memory shown in FIG. 2 is used.

Figure 6:
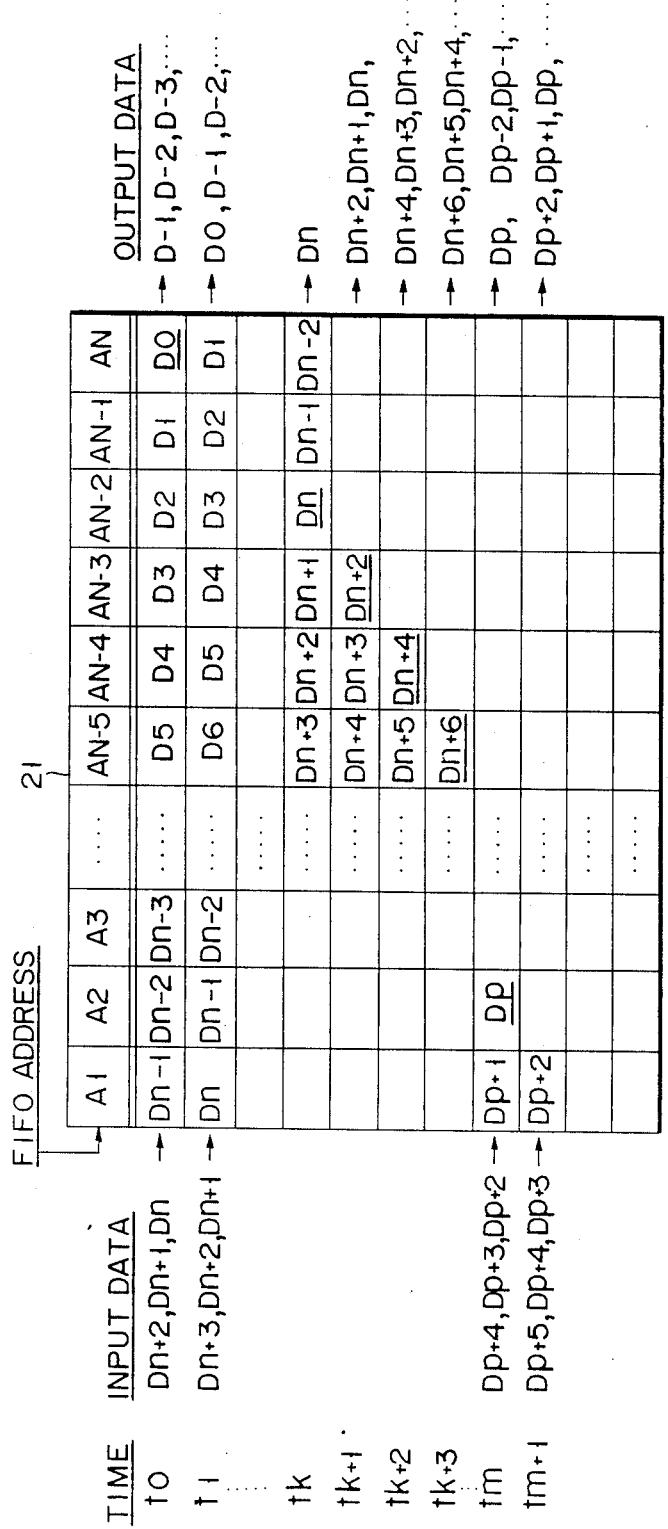
FIG. 6 is a diagram illustrating the storage status of data in the FIFO memory 21 shown in FIG. 4 at the time of reading out the data at high speed, and variations over time in data storage status in accordance with an input/output operation.

More specifically, upon receiving the data-save instruction, controller 10 sends a control signal to read clock generator 23 to increase the frequency of the read clock, thereby making the reading speed Vo of memory 21 faster than the writing speed Vi. FIG. 6 illustrates the movement of data within memory 21 and the variation in input/output data with time in this case. Each underlined data in FIG. 6 represents data at a read address. At time t0, the user confirms, through monitor device 7, signals which should be recorded (corresponding to, for example, Dn, Dn+1, . . . in memory 21) and sequentially changes the output address from An toward the write address to search for data Dn. In the example of FIG. 6, as data Dn is at address AN−2 at time tk, AN−2 is set as the read address and the data reading is started. As the reading signal-transfer rate Vo is faster than the writing signal-transfer rate Vi at this time, the read address is sequentially changed toward the write address.

Assume now that the read address is AN−2 at time tk and data Dn is read out and $tk=t0+kVi^{-1}$ (k: an integer). Then, the read address is changed to AN−3 at time tk+1 and data Dn+1 and Dn+2 are read out from address AN−3. Similarly, at time tk+2, the read address is changed to AN−4 and data Dn+3 and Dn+4 are read out from address AN−4. In this manner, the desired data sequence Dn, Dn+1, Dn+2, . . . started with Dn is read out from memory 21 and is transferred to main recorder 8 after being subjected to D/A conversion in reproduction signal processor 5.

If the length of the signal to be recorded in main recorder 8 is greater than the time determined by the memory capacity of memory 21, and the read address reaches the write address A1 during data reading from memory 21, controller 10 switches input switching circuit 2 to the mode for selecting the input signal Sin at that time and switches output switching circuit 6 to the mode for selecting the output signal of circuit 2. As a result, the input signal Sin is recorded as is, in main recorder 8. When the record stop instruction is given through input device 9 to controller 10 upon completing the recording of the desired signal, the recording operation of main recorder 8 is stopped, and input switching circuit 2 is switched to the mode for supplying the input signal Sin to record signal processor 3. At the same time, the read address of memory 21 returns to the normal position (AN) and the writing signal-transfer rate Vi of memory 21 becomes equal to the reading signal-transfer rate Vo, so that the mode returns to the initial ready status.

When a sync signal, synchronized with the reading signal-transfer rate of temporary memory 4, is supplied to main recorder 8 from controller 10 in accordance with the aforementioned change in reading signal-transfer rate of memory 21 for reproduction of the signal recorded in main recorder 8, the same signal as the input signal Sin can be acquired.

Figure 7:
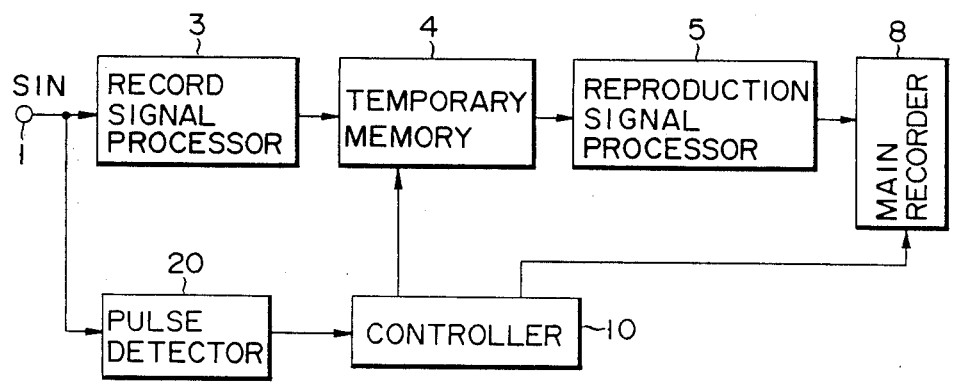
FIG. 7 is a block diagram illustrating the arrangement of a signal recording apparatus according to another embodiment of this invention.

FIG. 7 is a block diagram illustrating a signal recording apparatus according to another embodiment of this invention, which automatically records a pulse signal, such as a cardio-wave, an earthquake wave or an AE signal originating from structural destruction, which is part of an input signal Sin and is irregularly generated. The same numerals as used in FIG. 1 are used in this diagram to specify corresponding or identical sections.

In FIG. 7, the signal Sin applied to input terminal 1 is supplied to record signal processor 3 and a pulse detector 20. When detecting a pulse signal in the input signal Sin, pulse detector 20 sends a pulse detection signal to controller 10 which, upon receiving this detection signal, sends a fast read/retrieval command to temporary memory 4. Upon receiving of this command, the temporary memory 4, which is constituted by recording disk medium 11 shown in FIG. 2 or FIFO memory 21 shown in FIG. 4, retrieves the signal component corresponding to the written pulse signal while reading out its content at a signal-transfer rate faster than the writing signal-transfer rate in the above-described manner.

Temporary memory 4 has signals stored therein in the order input so that the writing position (address) corresponds to the writing time. It is therefore easy to know from the timing of the pulse detection signal from pulse detector 20 where in temporary memory 4 the pulse signal component is stored. The signal read out from temporary memory 4 is transferred through reproduction signal processor 5 to main recorder 8, which is set in the recording mode by the controller 10. In this manner, only pulse signals are recorded in main recorder 8.

Thereafter, temporary memory 4 is set in the ready mode, the state before the detection of the pulse signal, to be ready for the next pulse generation.

This embodiment has a feature of recording only a pulse signal component of an input signal Sin in main recorder 8 in addition to the same effects as produced by the embodiment of FIG. 1, so that the required recording capacity can be significantly reduced.

What is claimed is:

1. A signal recording apparatus comprising:
   temporary storage means for recording an input signal at a predetermined signal-transfer rate and reading out said recorded input signal at a variable signal-transfer rate and in the same sequence as input;
   main recording means for recording a signal read out from said temporary storage means; and
   control means for receiving a data-save instruction, outputting a start-writing signal to said main recording means, setting a signal-transfer rate for reading out said recorded input signal from said temporary storage means faster than the predetermined signal-transfer rate for writing a signal in said temporary storage means, and transferring said read out recorded input signal to said main recording means.

2. The signal recording apparatus according to claim 1, wherein said temporary storage means comprises:
   rotatable recording disk media;
   write head means for writing an input signal on said rotatable recording disk media; and
   read head means for reading out a signal recorded on said rotatable recording disk media;
   wherein said control means sets a track-seek speed of said read head means to be faster than that of said write head means upon receiving said data-save instruction.

3. The signal recording apparatus according to claim 2, comprising:
   said write head means and read head means reciprocating on said rotatable recording disk media in inwardly and outwardly radial movements, said write head means forming a plurality of concentric tracks on said rotatable recording disk media such that a first group of said plurality of concentric tracks formed during said inwardly radial movement and a second group of said plurality of concentric tracks formed during said outwardly radial movement are alternately located on said rotatable recording disk media.

4. The signal recording apparatus according to claim 1, wherein said control means comprises a general-purpose microcomputer.

5. The signal recording apparatus according to claim 1, further comprising:

switch means for switching, when a lengthy input signal being recorded by said temporary storage means requires a memory capacity greater than that provided by said temporary storage means, a remaining portion of said lengthy input signal in excess of said memory capacity of said temporary storage means directly to said main memory means without storage thereof in said temporary storage means.

* * * * *